United States Patent [19]
Iguchi et al.

[11] Patent Number: 5,185,741
[45] Date of Patent: Feb. 9, 1993

[54] INTER-NETWORK CONNECTING SYSTEM

[75] Inventors: Kazuo Iguchi, Yokohama; Hiroshi Takeo, Kawasaki; Shigeo Amemiya, Yokohama; Koji Tezuka, Kawasaki, all of Japan

[73] Assignee: Fujitsu Limited, Kawasaki, Japan

[21] Appl. No.: 640,437

[22] PCT Filed: May 30, 1990

[86] PCT No.: PCT/JP90/00706
   § 371 Date: Jan. 30, 1991
   § 102(e) Date: Jan. 30, 1991

[87] PCT Pub. No.: WO90/15510
   PCT Pub. Date: Dec. 13, 1990

[30] Foreign Application Priority Data

May 30, 1989 [JP] Japan ............... 1-134540

[51] Int. Cl.[5] .............................. H04J 3/12
[52] U.S. Cl. ........................ 370/110.1; 370/65; 370/60; 370/94.1; 379/133; 379/219; 379/225
[58] Field of Search .............. 370/65, 85.13, 85.14, 370/60, 94.1, 110.1; 379/133, 219, 225

[56] References Cited

U.S. PATENT DOCUMENTS

| | | | |
|---|---|---|---|
| 4,173,713 | 11/1979 | Giesken et al. ............... | 370/65 X |
| 4,442,502 | 4/1984 | Friend et al. ............... | 370/58.2 X |
| 4,707,827 | 11/1987 | Bione et al. ............... | 370/85.13 |
| 4,791,662 | 12/1988 | Ahnen et al. ............... | 379/158 |
| 4,792,800 | 12/1988 | Fujioka et al. ............... | 340/825.05 |
| 4,809,260 | 2/1989 | Davidson et al. ............... | 370/58.2 |
| 5,022,024 | 6/1991 | Paneth et al. ............... | 370/79 X |

FOREIGN PATENT DOCUMENTS 1-309495 12/1989 Japan .
2-86391 3/1990 Japan .

OTHER PUBLICATIONS

Donald K. Melvin, Development of ISDN Products and Services as a User and Manufacturer, Nov. 20, 1986, session 10, vol. 3, paper 4, pp. 1-7, Los Angeles, Calif., US.

AT&T Technical Journal, Priority Statistical Multiplexer Design for SNA*/SDLC Access to a Virtual-Circuit Packet Network, Nov./Dec. 1988, pp. 69-86, Short Hills, N.J., US.

Primary Examiner—Douglas W. Olms
Assistant Examiner—Russell W. Blum
Attorney, Agent, or Firm—Staas & Halsey

[57] ABSTRACT

An inter-network connecting system comprising a main network having an exchange function and a subnetwork having no exchange function, to improve the expandability, economy, and efficiency of the subnetwork. When an extension line communication which is a communication in the subnetwork is to be carried out, a call setting processing processor in the main network gives a calling terminal a first special signal so as to operate lookback means in a connection control unit in the subnetwork to set a physical communication paths for an extension line between terminals in the subnetwork; and when an outer line communication which is a communication between the main network and a terminal in the subnetwork is to be carried out, the call setting processing processor gives a calling terminal a second signal so as to stop the operation of the loopback means in the connection control unit to set a physical communication path for an outer line between the exchange and the terminal in the subnetwork.

29 Claims, 15 Drawing Sheets

EXTENSION LINE:LB=(VCI=1XXXXXX),X IS ARBITRARY (0 OR 1)
 CC:DATA BELONGING TO LB ON T LINE
    ARE TRANSFERED TO TB SIDE
OUTER LINE:TH=(VCI=0XXXXXX), X IS ARBITRARY (0 OR 1)
 CC:THROUGH, DATA BELONGING TO TH ON T LINE
    ARE TRANSFERED TO SW SIDE

CRC : ERROR CORRESPONDING CODE FOR
      LB SIGNAL

FIG. 15
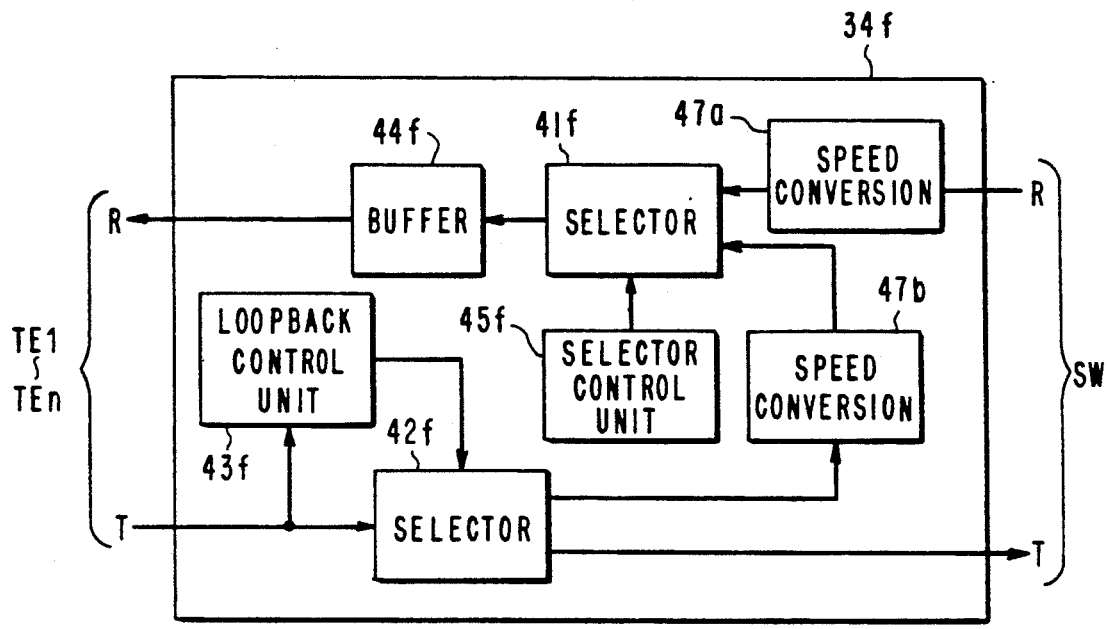
FIG. 16A
PR: PRIORITY SIGNAL
FIG. 16B
PR = " 1 " : OUTER LINE HAS PRIORITY
PR = " 0 " : EXTENSION LINE HAS PRIORITY
FIG. 16C
PR = " 2 " : SIGNALING
PR = " 1 " : VOICE, VIDEO (STM)
PR = " 0 " : DATA

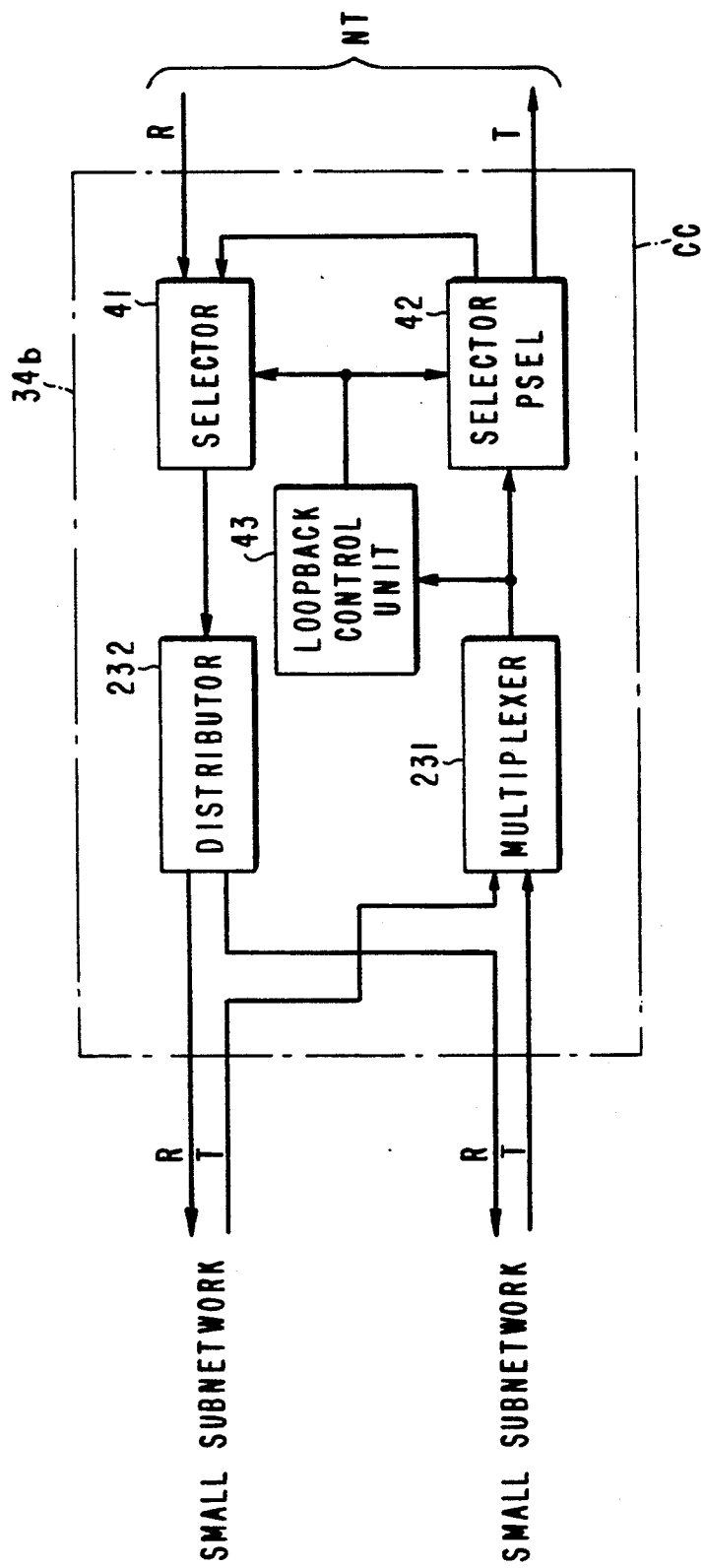

INTER-NETWORK CONNECTING SYSTEM

BACKGROUND OF THE INVENTION

1. Field of the Invention

The present invention relates to a packet communication system for dividing data into digitalized blocks for transfer, and in particular to an inter-network connecting system between a main network with an exchange function and a subnetwork without an exchange function.

For example, there is a public network as the main network, and there is, a customer station network as the subnetwork, connected to the public network.

2. Description of the Related Art

Conventionally, data communication networks have been developed based on a telephone exchange network, however, accompanied by the rapid expansion of the data processing field, various problems due to lack of functions in the communication systems have been pointed out. As a countermeasure to solve these problems, an integrated services digital network (ISDN) has been provided. The ISDN is being reconstructed from a conventional narrow band ISDN (64 Kbps) to a broad band ISDN (150 Gbps) in which various services such as a data communication network, facsimile network, voice network, various private line networks, picture communication network, and so forth are integrated into one digital communication network. Due to the rapid development of communication techniques such as the above-mentioned ISDN, data processing techniques and so forth, it has been desired to provide a data communication system in which various terminals and data instruments are combined, and in which data and resources can be efficiently utilized. In particular, to correspond to the demands for broad band and multimedia services, for a variety of communication configurations, etc., it has been desired to develop an economic, easy to expand, and efficient system in a subnetwork as well as the main network, when the subnetwork (such as a customer station network) is connected to the main network (such as a public network).

In a conventional subnetwork, a network connecting system is known which comprises a PBX having an exchange function and a call processing processor for controlling the PBX so it can be connected to a main network. In this conventional system, however, as described later in more detail with reference to the drawings a call process setting means is necessary in the subnetwork. Thus, if the subnetwork is used as a customer station network, it is suitable for a big company, but there is a problem in economy for small companies or a standard home.

In another conventional network connecting system, there is a system in which the exchange function necessary for the subnetwork (for example a customer station network) is provided in an exchange of a main network. In this conventional system, since the subnetwork itself does not have the exchange function, the cost can be made lower than the above-mentioned first conventional system.

In this conventional system, however, as described later in more detail with reference to the drawings, even for data transfer between terminals in the subnetwork, a physical communication path is provided in a subscriber line between the subnetwork and the main network for folding the signal in the exchange in the main network so that there is a problem in that the traffic amount in the exchange is increased and the capacity of the exchange must be large.

Also, in order to effectively accommodate a plurality of subscribers, when a subscriber network constitution is utilized in which a multiplexing line concentration unit is inserted between the subscriber lines, it is necessary to make the capacity of the feeder loop large and to provide an exchange function (remote exchange function) for suitable distribution of data from the feeder loop to respective subscribers.

SUMMARY OF THE INVENTION

In view of the problems in the above-described conventional arts, the objects of the present invention are, in realizing an inter-network connecting system between a main network (for example, a large scale network (a basic LAN) or a public network) and a subnetwork (for example, a branch LAN or a customer station network), to provide expandability to enable the realization of various subnetwork constructions, to economize by reducing the initial cost so that the system can be introduced into a usual home, and to improve efficiency so as to reduce the influence of the traffic in the subnetwork on the main network.

To attain the above objects, according to the present invention, there is provided an inter-network connecting system with a main network which has an exchange and a call setting processing processor for controlling the exchange, and a subnetwork which has terminals and a connection control unit with loopback means. When an extension line communication, which is a communication in the subnetwork, is to be carried out, the call setting processing processor sends a calling terminal a first special signal so as to make the loopback means in the connection control unit operate to set a physical communication path for an extension line between terminals in the subnetwork. When, however, an outer line communication, which is a communication between the main network and a terminal in the subnetwork, is to be carried out, the call setting processing sends a calling terminal a second special signal so as to stop the operation of the loopback means in the connection control unit and to set a physical communication path for an outer line between the exchange and the terminal in the subnetwork. The first special signal and the second special signal are transmitted from the call setting processing processor to the calling terminal, and the calling terminal adds the received first or second special signal to transmitting data to be transmitted. The connection control unit determines whether the loopback means should be operated or not for each data in accordance with the first special signal or the second special signal, and sets a physical communication path for the extension line communication and/or the outer line communication, accordingly.

It is preferable that the main network and the subnetwork be utilized to construct an integrated services digital network (ISDN).

It is preferable that the first special signal and the second special signal are one or a plurality of fixed data groups, respectively.

It is preferable that the connection control unit comprises a rewritable table, the first special signal and the second special signal are one or a plurality of fixed data groups, respectively; one or a plurality of data group corresponding to the first special signal and the second special signal are stored in the rewritable table, and the connection control unit compares the first special signal or the second special signal added to the data from the calling terminal with the contents of the table, whereby judgement is made as to whether the loopback function should be operated or not, to set a physical path.

It is preferable that the call setting processing processor comprises means for rewriting the contents of the table in the connection control unit.

It is also possible that the terminals comprise means for rewriting the contents of the table in the connection control unit.

It is preferable that the connecting control unit comprises means for supervising traffic of the extension line communication and of the outer line communication; and the contents of the table are automatically changed in accordance with the amount of traffic in such a way that, the amount of data of the first special signal is increased when the amount of traffic of the extension line communication becomes larger than the amount of traffic of the outer line communication, and the amount of data of the second special signal is increased when the amount of traffic of the outer line communication becomes larger than the amount of traffic of the extension line communication.

It is also preferable that a third signal is provided for simultaneously setting physical paths in the communication in the subnetwork and in the communication between the main network and the terminal of the subnetwork, whereby by the third signal, physical paths for the extension line communication and for the outer line communication can be simultaneously set.

It is also possible that the data has a destination identification label therein, and the first special signal and the second special signal are logically provided in the destination identification label.

It is preferable that the third special signal is logically provided in the destination identification label.

It is preferable that the first special signal, the second special signal, and the third special signal are subjected to error correction.

It is also possible that the destination identification label is subjected to error correction.

It is possible that the connection control unit is provided with a buffer for storing data, and when an idle communication is found in the line from the main network, data is taken out from the buffer and transferred to the terminal.

It is also possible that a buffer for storing data is provided on the line between the connection control unit and the main network, and when an idle communication is found in the loopback line, data is taken out from the buffer and transferred to the terminal.

It is also possible that a first buffer and a second buffer for storing data are provided respectively in the loopback means in the connection control unit and on the line between the connection control unit and the main network so that data is alternately taken out from the first buffer and the second buffer and transferred to the terminal.

It is also possible that the connection control unit comprises an empty buffer detecting unit for detecting which of the first buffer and the second buffer is empty, and, when either one of the buffers is empty, data are sequentially transferred from the other buffer to the terminal.

It is also possible to comprise a buffer common to the loopback means in the connection control unit and the line of the connection control unit from the main network, and writing means for writing loopback data and data from the main network at high speed so that the data is transferred to the terminal in accordance with the writing sequence into the buffer.

It is also possible that the loopback data and the data from the main network are provided with priority data, and the connection control unit transfers the data from the terminal and the data from the main network to the terminal in the sequence of priority in accordance with the priority data.

It is preferable that the priority data indicates whether or not the extension line communication has a priority to the outer line communication.

It is also possible that the priority data indicates a priority depending on the contents of the communication services.

It is preferable that the connection control unit comprises a priority control unit for writing data and the priority data into the buffer, and the priority control unit transfers that data to the terminals in accordance with the priority data read from the buffer.

It is preferable that the connection control unit comprises a plurality of buffers for storing different priority data, the data are stored in respective buffers based on the priority data, and the data are transferred from respective buffers to the terminals in the order of the priority.

It is also possible that the terminals construct a plurality of subnetworks, and the plurality of subnetworks are connected to the main network.

BRIEF DESCRIPTION OF THE DRAWINGS

FIG. 15 is a block diagram showing an example of the construction in which a common buffer is provided in the connection control unit, according to eleventh embodiment of the present invention, FIG. 16A is a diagram for explaining an example in which a priority signal is added to data, according to twelfth embodiment of the present invention, FIG. 16B is a diagram showing an example of the priority signal in FIG. 16A, FIG. 16C is a diagram showing another example of the priority signal in FIG. 16A, FIG. 23 is a block diagram showing a construction of the connection control unit in FIG. 22.

DESCRIPTION OF THE PREFERRED EMBODIMENTS

Throughout the specification, the same reference numbers represent the same parts, and the same numbers with appended characters represent modifications of the same parts.

For a better understanding of the present invention, conventional inter-network connecting systems are explained with reference to FIG. 1 and FIG. 2.

Figure 1:
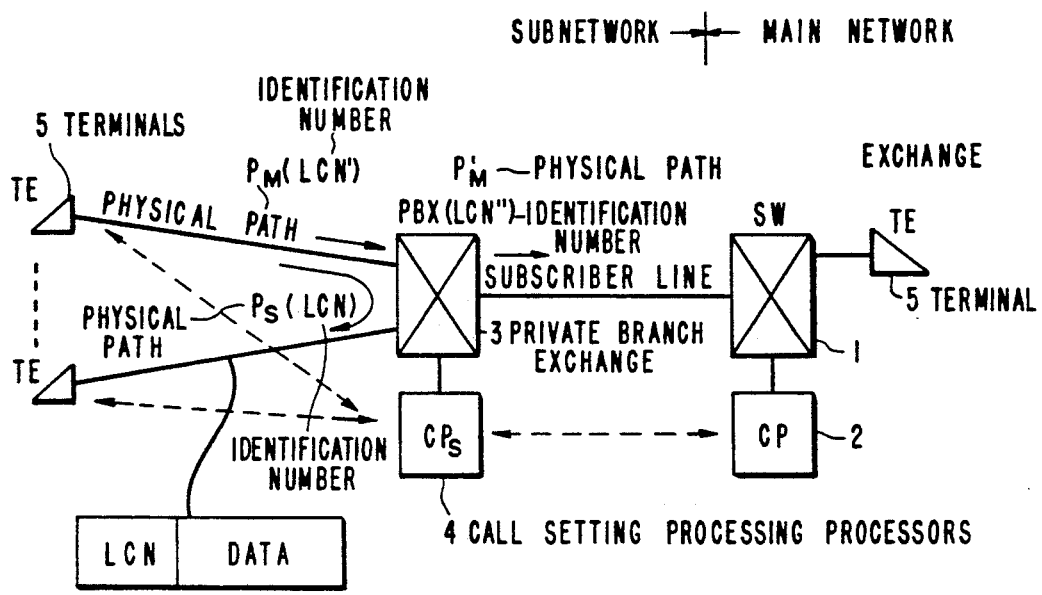
FIG. 1 is a block diagram showing an example of a conventional inter-network connecting system.

FIG. 1 is a block diagram showing an example of a conventional inter-network connecting system. In FIG. 1, a main network (for example, a trunk LAN) is provided with an exchange (SW) 1 for setting a physical path and a call setting processing processor (CP) 2 for carrying out a call setting processing by transmitting and receiving signals before setting the physical path. In the subnetwork (for example a branch line or a customer station network) also, a private branch exchange (PBX) 3 is provided for setting a physical path and a call setting processing processor ($CP_s$) 4 is provided for carrying out a call setting processing by transmitting and receiving signals before setting the physical path.

Each terminal (TE) 5 accommodated by the PBX 3 requires, when communication is to be carried out, an identification number of the opposite terminal, from the PBX 3 regardless of whether the opposite terminal is in the subnetwork or out of the subnetwork. The call setting processing processor ($CP_2$) 4 which receives the requirement supplies a logical identification number (LCN) for communication or a destination identification label (VCI), which is different depending on whether the opposite terminal is in the subnetwork or in the main network, to the call originating terminal and the opposite terminal. When the opposite terminal (TE) 5 receives this, the call setting process is completed, and thereafter, a physical path is set between the terminals.

For example, when the requirement from the terminal 5 is data communication with another terminal in the subnetwork, the PBX 3, which received this requirement, gives a logical identification number LCN provided in the header of the received packet to the opposite terminal, as shown in the figure, and after a call setting processing shown in the figure by dotted line, a physical communication path $P_s$ between the terminals is set.

When the request from the terminal 5 in the subnetwork is to effect data communication with a terminal in the main network, the $CP_s$ 4 connected to the PBX 3 provides the received logical identification number LCN' of the opposite terminal to the CP 2 in the main network, so that a physical path $P_M$ is set after a call setting processing between the terminal 5 and the PBX 3, and the CP 2 which received the logical identification number LCN' provides a logical identification number N" of the calling origin to the $CP_s$ 4 in the subnetwork so that a physical path $P'_M$ is set between the main network and the subnetwork.

As described above, there are several methods of terminal connection, including a method for directly designating the terminal number of the opposite terminal, a method for distributing a connection requirement from a terminal to all terminals by a broadcasting method using a compatibility check function in each terminal for designating a terminal which provided a response, and a method of mixing both methods.

The conventional system in FIG. 1 provides flexibility. However, since it requires a high-cost call setting processing processor ($CP_2$) 4 in the subnetwork such as a customer station network, it is suitable for use in a big company but there is a problem in economy for use in a small company or a standard home.

Figure 2:
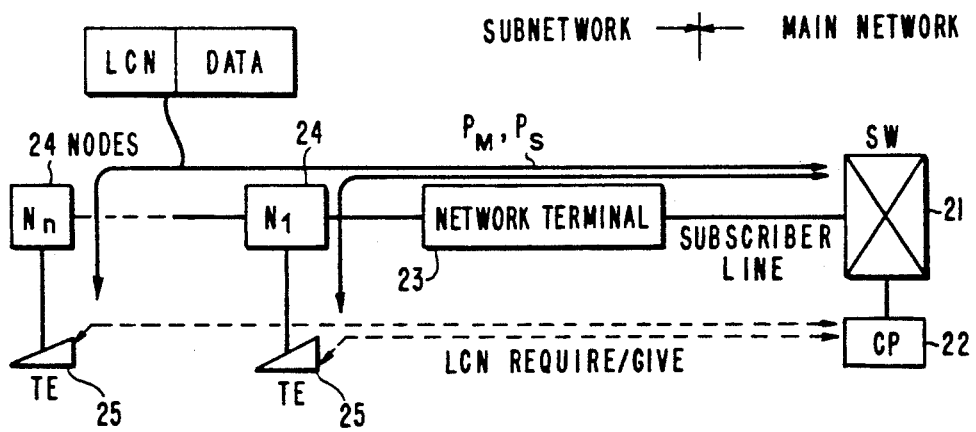
FIG. 2 is a block diagram showing another example of a conventional inter-network connecting system.

FIG. 2 is a block diagram showing another example of a conventional inter-network connecting system. In the figure, an example is shown in which a subnetwork (customer station network and so forth) in an ISDN and a main network in a main network are connected. The main network comprises an exchange (SW) 21 and a call setting processing processor (CP) 22. The subnetwork comprises a network terminal (NT) 23 having no exchange function, a plurality of nodes ($N_1$ to $N_n$) 24, and terminals (TE) 25 respectively connected to these nodes.

In this case, the exchange function of the subnetwork is provided in the exchange SW. In the transfer between a terminal in the subnetwork and the main network, a physical path $P_M$ is provided in a subscriber line between the subnetwork and the main network. In case of the transfer between terminals in the subnetwork, a physical communication path $P_S$ is also provided in a subscriber line between the subnetwork and the main network but folding is effected by the exchange (SW) 21.

When the exchange function of the main network (public network) is utilized to realize the communication between terminals in the subnetwork (customer station network) in the above-mentioned way, the amount of traffic in the exchange (SW) 21 is increased. Thus there is a problem in that the capacity of the exchange (SW) 21 be required to be large. Also, if a subscriber network construction is applied in which a multiplexing line concentration unit is inserted between subscriber lines in order to efficiently accommodate a plurality of subscribers, there is a problem that the capacity of the feeder loop must be made large and an exchange function (remote exchange function) is necessary for suitably distributing data from the feeder loop to respective subscriber lines.

Next, embodiments of the present invention are described.

Figure 3:
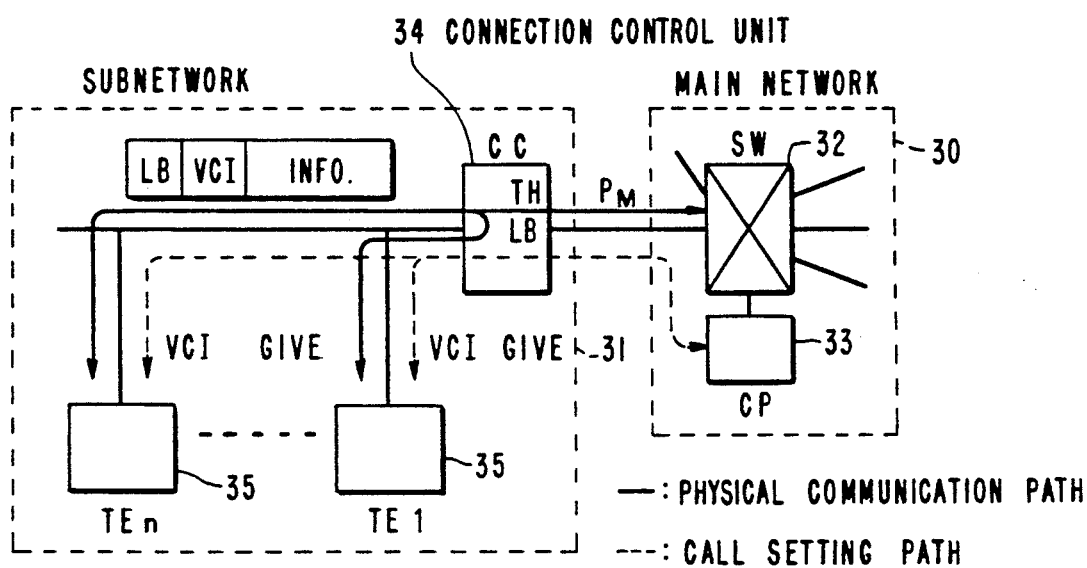
FIG. 3 is a block diagram showing an inter-network connecting system according to a first embodiment of the present invention.

FIG. 3 is a block diagram showing an inter-network connecting system according to a first embodiment of the present invention. In the figure, a main network 30 has an exchange (SW) 32 and a call setting processing processor (CP) 33. A subnetwork 31 has a plurality of terminals (or units, hereinafter simply referred to as terminals) (TE1−TEn) 35 and a connection control unit (CC) 34 having a loopback function.

The operation of the first embodiment will be briefly explained. In the connection control unit (CC) 34, when a communication between terminals in the subnetwork 31 is effected, loopback is carried out in the subnetwork without providing a physical communication network. Therefore, a physical communication path for connecting the main network 30 and the subnetwork 31 is set only for the communication between a terminal in the subnetwork 31 and a terminal (not shown in the figure) accommodated to the main network.

Namely, in the call setting processing, based on the requirement from a calling terminal 35, the call setting processing processor (CP) 33 allocates to the calling terminal and to the opposite terminal, a destination identifying label VCI and a signal LB or TH for specifying whether or not a loopback is to be effected in the subnetwork. The calling terminal transmits a packet including the destination identifying label VCI, data (INFO), and a special signal (LB/TH) for distinguishing the loopback LB or the through signal TH.

When the special signal in the packet transmitted from the calling terminal 5 to the connection control unit (CC) 34 is the loopback signal LB, the loopback function in the connection control unit (CC) 34 operates. As a result, the physical communication path is folded in the subnetwork and becomes a physical communication path $P_s$ for extension line, and it does not pass through the exchange (SW) 32 of the main network 30.

When the special signal in the packet transmitted from the calling terminal 5 to the connection control unit (CC) 34 is the through signal TH, the loopback function of the connection control unit (CC) 34 is stopped so that the physical path for external lines is connected through the exchange (SW) 32 to the called terminal.

The loopback signal LB and the through signal TH are added to the packet, which is to be transmitted to the calling terminal, by the call setting processing processor (CP) 33 at the time of call setting processing. The calling terminal which received the loopback signal and the through signal TH transmits a transmitting packet or cell including the loopback signal LB or the through signal TH to the connection control unit (CC) 34.

In FIG. 3, in response to all communication requests from the terminals (TE1 to TEn) 35, the call setting processing processor (CP) 33 in the main network 30 judges the destination required to be connected, communication mode, and so forth to provide a specific destination identifying label VCI to the calling terminal. For example, a VCI used for communication in the subnetwork and a VCI used for communication from the subnetwork through the main network are defined as follows.

Communication in the subnetwork:
VCI#1=(1XXXXXX)
Communication through the main network:
VCI#0=(0XXXXXX)
where X is arbitrary (0 to 1)

A terminal, for example (TE1) 35, receives a destination identification label VCI from the call setting processing processor (CP) 33 by the communication with the call setting processing processor (CP) 33, provides the label VCI to the head of the blocked transmitting data, and transmits the label VCI. The connection control unit (CC) 34 carries out connection control by distinguishing the above-mentioned special bit in the destination identification label VCI. For example, when VCI=VCI#1, the connection control unit (CC) 34 folds the packet belonging to the VCI#1 from the T line to the R line (see FIG. 4). Also, when VCI=VCI#0, the connection control unit (CC) 34 delivers the packet belonging to the VCI#0 to the main network 30.

With this construction, since the call setting process necessary for the communication between terminals in the subnetwork is carried out by the use of the call setting processing processor in the main network, the subnetwork does not require any unit (for example PBX) relating to a call setting process other than terminals so that an economical network can be constructed. Also, since the traffic by the communication in the subnetwork is folded by the connection control unit (CC) 34, it never flows into the exchange (SW) 32 in the main network 30, and as a result the main network can be efficiently operated.

Even though the call setting process is carried out by the call setting processing processor (CP) 33 connected to the exchange (SW) 32, the traffic of the call setting process is very small in comparison with the actual communication traffic, and the increased traffic of the call setting process by the communication in the subnetwork is only in the order of adding the special signal LB or TH for grouping the packet into interior and exterior of the subnetwork to the destination identification label VCI, which is negligible.

It is preferable that the main network and the subnetwork are constructed as an integrated services digital network (ISDN).

Figure 4:
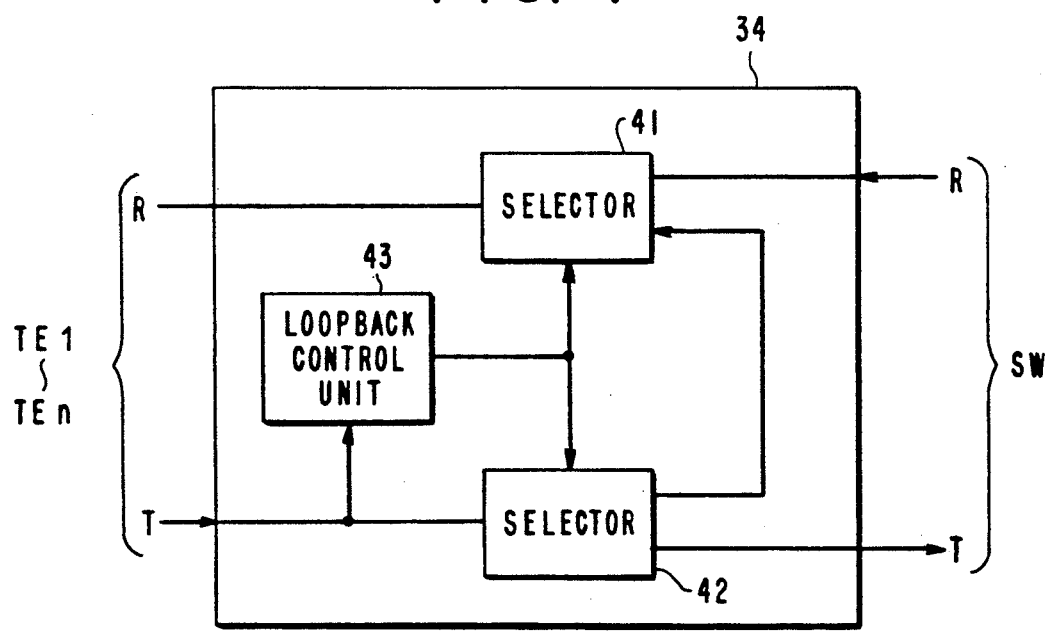
FIG. 4 is a block diagram showing an example of the construction of the connection control unit (CC) in FIG. 3, FIG. 5A and FIG. 5B are block diagrams for explaining an example of the operation of the connection control unit shown in FIG. 4.

FIG. 4 is a block diagram showing an example of the construction of the connection control unit (CC) 34 shown in FIG. 3, comprising two selectors 41 and 42, and a loopback control unit 43 for receiving the special signals LB and TH from the terminals (TE1−TEn).

The loopback control unit 43 receives the special signal LB/TH from the calling terminal (TE1−TEn) through the tip line T, and in accordance with this signal, controls the selectors 41 and 42.

The selector 41 selects data from the exchange (SW) 32 or data from the selector 42 in accordance with the output of the loopback control unit 43. The selector 42 outputs data from the terminal (TE1−TEn) 35 to the selector 41 or to the tip line T for outputting to the exchange (SW) 32.

In one possible embodiment of the invention, when the special signal LB is "1", the loopback is carried out, and when the special signal LB is "0", the through operation is carried out.

Figure 5A:
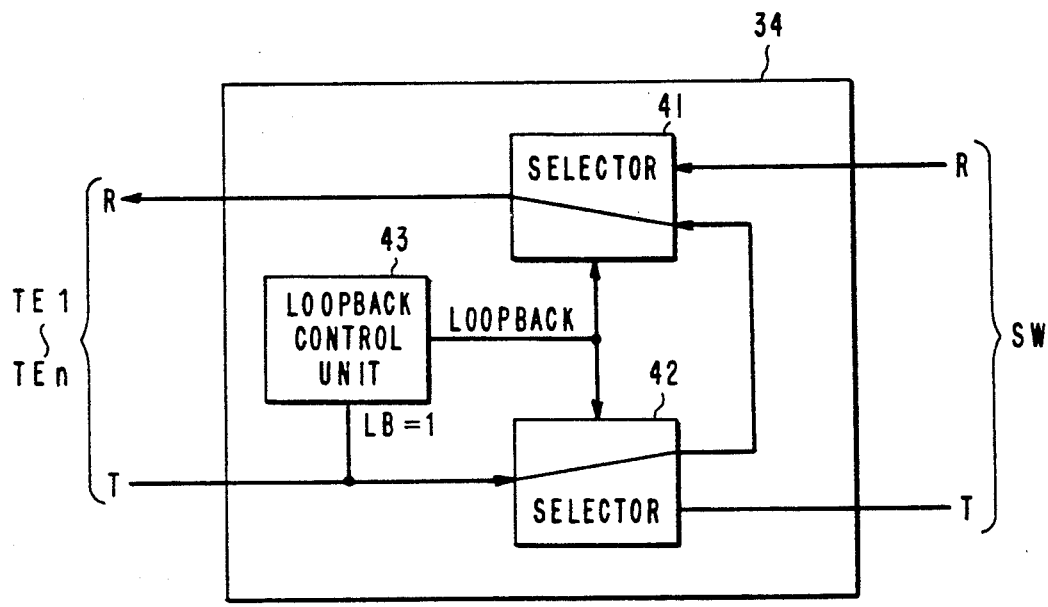

FIG. 5A is a diagram showing a connection configuration of the selector when the special signal LB received by the loopback control unit 43 is "1". In this case, the loopback control unit 43 gives the selectors 41 and 42 the loopback signal. The selector 42 supplies a packet received from the calling terminal through the tip line T to the input of the selector 41 in accordance with the loopback signal. In accordance with this loopback signal, the selector 41 does not select data on the ring line R from the exchange SW but selects and outputs data from the selector 42. As a result, a physical path in the subnetwork is set so that communication can be realized without passing through the exchange SW.

Figure 5B:
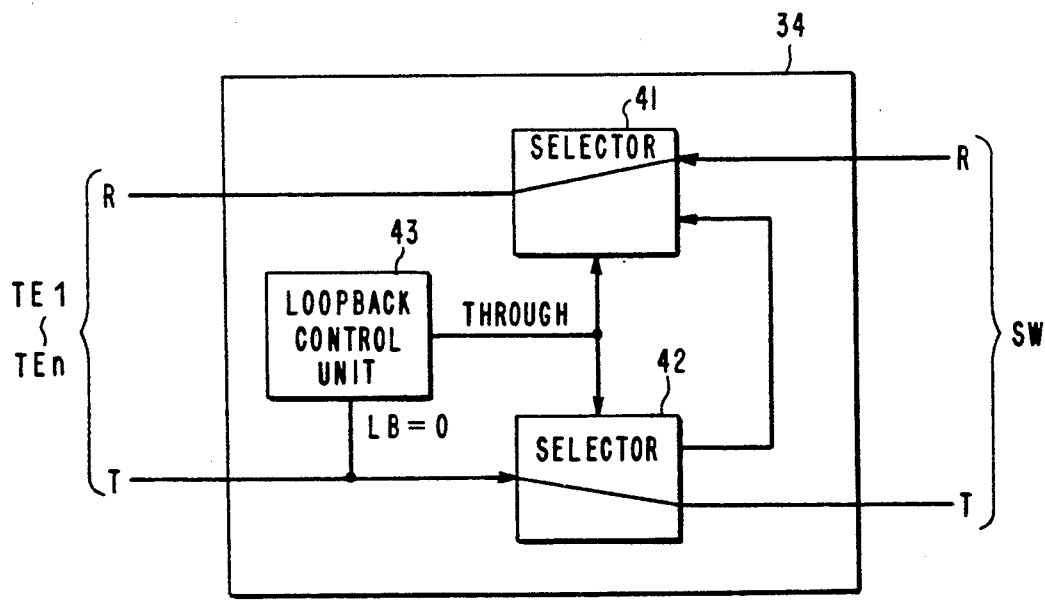

FIG. 5B is a diagram showing a connection configuration of the selector when the special signal received by the loopback control unit 43 is "0". In this case, the loopback control unit 43 gives the selectors 41 and 42 the through signal. The selector 42 supplies a packet received from the calling terminal through the tip line T to the ring line R at the side of the exchange SW in accordance with the loopback signal. In accordance with this through signal, the selector 41 selects and outputs data from the exchange SW through the ring line R but does not select data from the selector 42. As a result, a physical path $P_M$ between the subnetwork and the main network is set so that communication becomes possible.

According to second embodiment of the present invention, instead of representing the loopback signal and the through signal by one bit added to the outer of the destination identification label as described above, the signal may be logically allocated within the destination identifying label. This embodiment is shown in FIG. 6.

Figure 6:
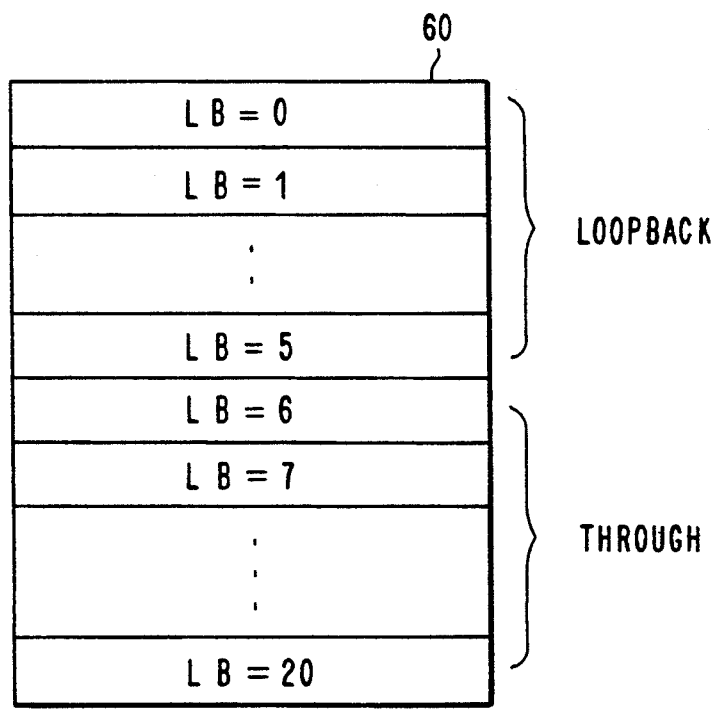
FIG. 6 is a diagram showing an example of the construction of the table provided in the connection control unit according to a second embodiment of the present invention.

FIG. 6 is a diagram showing the contents of a table provided in the connection control unit (CC) 34 and in the call setting processing processor (CP) 33. In the figure, as a plurality of loopback signals LB, 0-20 (decimal expression) are stored in the table 60. As an example, LB=0 to LB=5 are signals for effecting loopback, and LB=6 to LB=20 are signals for effecting through communication. The loopback signals 0-20 are the destination identifying labels themselves in this embodiment. Therefore, when the destination identifying label in the packet transmitted from a calling terminal in the subnetwork is one of 0-5, loopback is effected to carry out an extension communication. When the destination identifying label is one of 6-20, through communication with an outer line is carried out.

The contents of the table 60 can be rewritten by the control by the call setting processing processor (CP) 33, the control by a terminal having a function to supervise traffic, or the control by the connection control unit (CC) 34.

Figure 7:
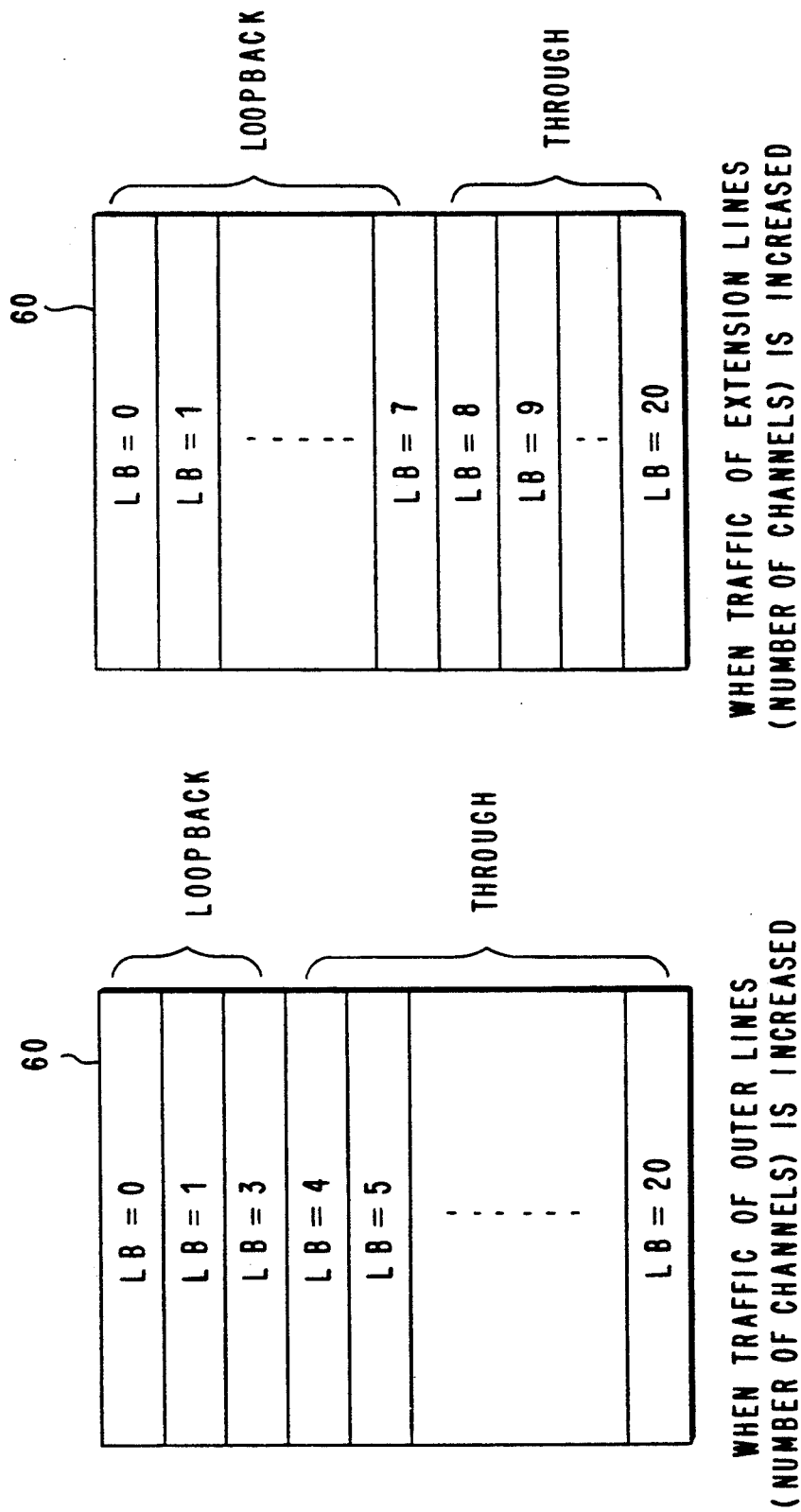
FIG. 7 is a diagram for explaining a third embodiment of the present invention changing the contents of the table shown in FIG. 6 in accordance with the amount of traffic.

In FIG. 6, the destination identification label for loopback and the destination identification label for through communication are fixedly provided. Alternatively, however, according to a third embodiment of the present invention, the destination identification label for loopback may be changed in accordance with traffic. FIG. 7A and FIG. 7B illustrate this.

In FIG. 7A, in order to decrease the number of calls of the loopback when the traffic of the outer line (the number of channels) is increased, only LB=0 and LB=2 are the destination identification labels for loopback, and LB=3 to LB=20 are all the destination identification labels for through communication for outer lines.

In FIG. 7B, in order to increase the number of calls of the loopback when the traffic of the extension line (the number of channels) is increased, LB=0 to LB=7 are the destination identification labels for loopback, and LB=8 to LB=20 are the destination identification labels for through communication for the outer lines.

Figure 8:
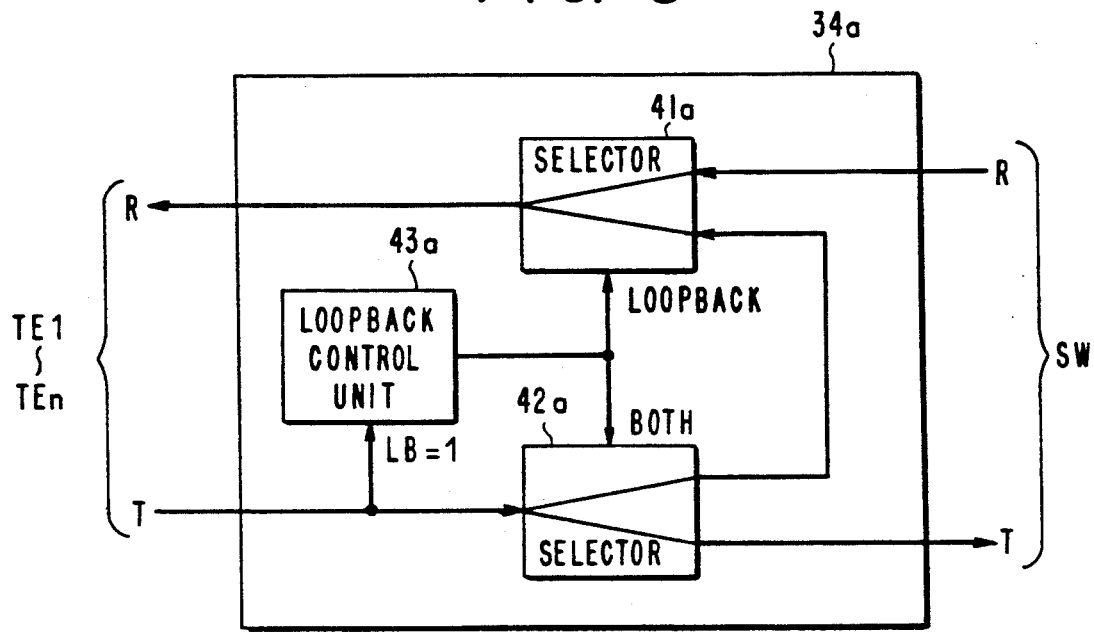
FIG. 8 is a block diagram for explaining a path when physical communication paths are provided simultaneously in the extension line and the outer line, according to a fourth embodiment of the present invention.

FIG. 8 is a block diagram showing the construction of the connection control unit (CC) according to a fourth embodiment of the present invention. In this embodiment, in addition to the above-mentioned LB and TH signals, a both-way signal BT for setting physical paths in both the extension line and the outer line simultaneously is used. When a loopback control unit 43a receives the both-way signal BT=1, it gives the selector 42a the both-way signal and gives the selector 41a the loopback signal. As a result, the selector 42a sends a packet from a calling terminal in the subnetwork to both the tip line T of the exchange side and to the input of the selector 41a, and the selector 41a receives the loopback signal so as to selectively send the output signal from the selector 42a to the ring line R of the subnetwork side. In this way, physical paths are simultaneously set for the terminal in the subnetwork and for the terminal in the main network so that the same data can be transmitted in a broadcasting configuration.

Figure 9:
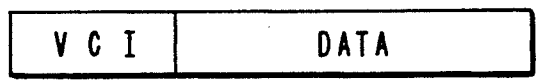
FIG. 9 is a diagram for explaining an example in which a code for setting a path in an extension line, in an outer line, or in both lines is logically provided to a destination identification label, according to still a fifth embodiment of the present invention.

FIG. 9 is a diagram showing a data format according to a fifth embodiment of the present invention. In the figure, a packet consists of a VCI in a header part and data in a data part. The destination identification label VCI consists of 7 bits. When its top bit is "1", it is the loopback signal LB so that the connection control unit (CC) performs a loopback control in which data belonging to LB in the T line is delivered to the TE side. When the top bit of the destination identification label is "0", it is the through signal TH so that the connection control unit (CC) performs a through control in which data belonging to the TH in the T line is delivered to the exchange side SW.

Figure 10:
FIG. 10 is a diagram for explaining an example in which an error correction is conducted on a special signal or a destination identification label for setting a path in an extension line, in an outer line, or in both lines, according to a sixth embodiment of the pretend invention.

FIG. 10 is a diagram showing a data format according to a sixth embodiment of the present invention. In the figure, the loopback signal LB is not logically included in the destination identification label VCI but is provided separately from the destination identification label VCI, and further, the loopback signal LB is provided with a CRC code for effecting error correction. The CRC code may be provided in the through signal TH or in the destination identification label VCI.

Figure 11:
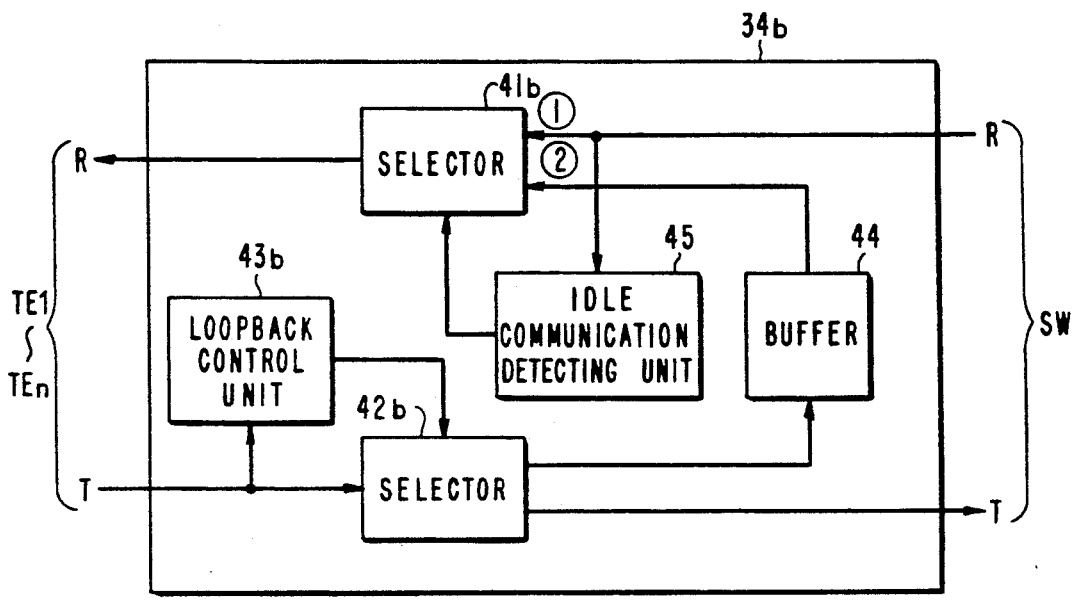
FIG. 11 is a block diagram showing an example of the construction in which a buffer is provided in the connection control; unit, according to a seventh embodiment of the present invention.

FIG. 11 is a block diagram showing the construction of the connection control unit (CC) according to a seventh embodiment of the present invention. In the figure, the connection control unit (CC) 34b comprises, in addition to the selectors 41b and 42b and the loopback control unit 43b, a buffer 44 and an idle communication detecting unit 45. The buffer 44 is provided in the loopback path between the selector 42b and the selector 41b, and stores packets output from the selector 41b for loopback. When the idle communication detecting part 45 detects an idle communication in the line ① from the main network, it controls the selector 41b so as to selectively output the output ② of the buffer 44 to the R line of the subnetwork side.

Thus, only when an idle communication is produced in the line from the main network, is the loopback carried out so that the line is efficiently utilized. This is effective when the traffic of the outer line is large.

Figure 12:
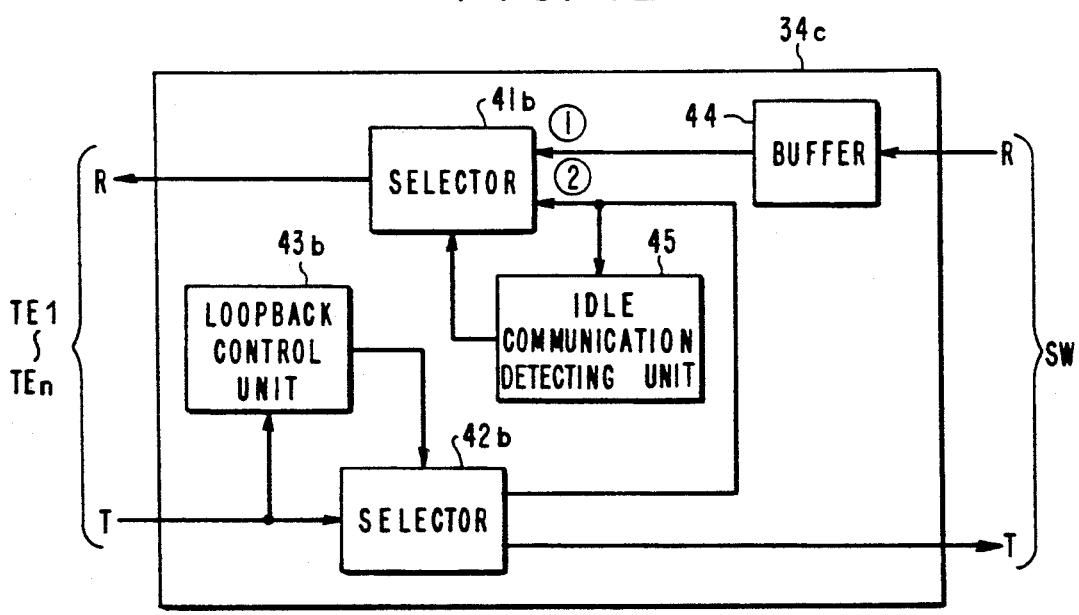
FIG. 12 is a block diagram showing another example of the construction in which a buffer is provided in the connection control unit, according to an eighth embodiment of the present invention.

FIG. 12 is a block diagram showing the construction of the connection control unit (CC) according to an eighth embodiment of the present invention. In the figure, the buffer 44 is provided between the R line from the main network and the input of the selector 41b for storing the packets from the main network. The idle communication detecting unit 45, when detects an idle communication in the loopback ② from the selector 42b, controls the selector 41b to selectively output the packet ① in the buffer 44 to the R line of the subnetwork side.

Thus, the packet from the main network can be transferred to the subnetwork only when an idle communication is produced in the loopback, so that this is effective when the traffic of the extension line is large.

Figure 13:
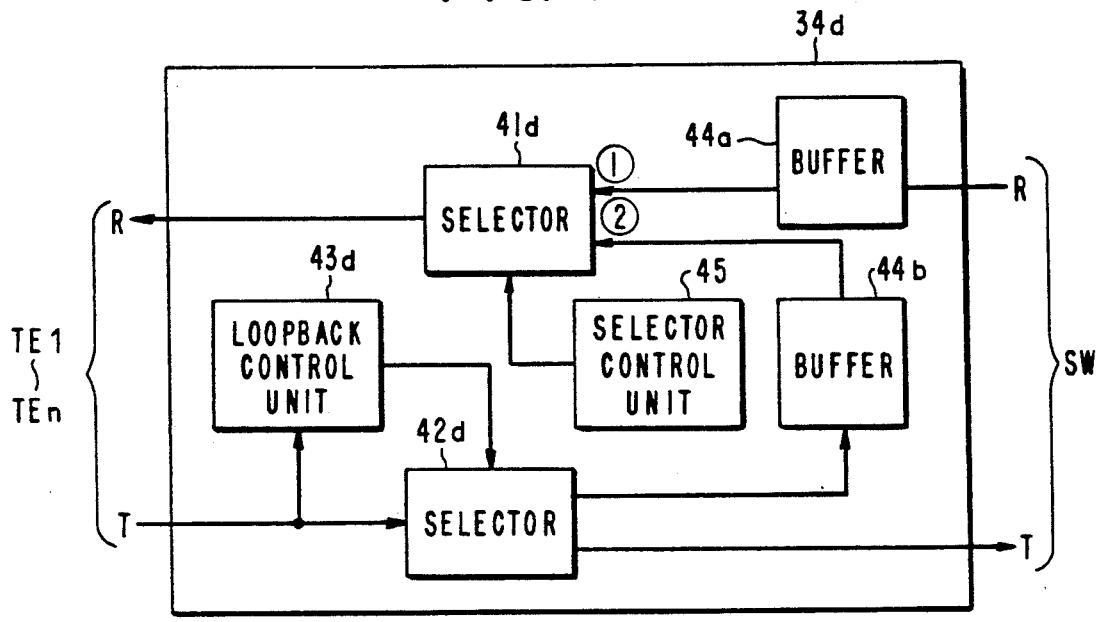
FIG. 13 is a block diagram showing an example of the construction in which two buffers are provided in the connection control unit, according to ninth embodiment of the present invention.

FIG. 13 is a block diagram showing the construction of the connection control unit (CC) according to a ninth embodiment of the present invention. In the figure, two buffers 44a and 44b are provided. The buffer 44a is arranged between the R line from the main network and the input ① of the selector 41d. The buffer 44b is arranged between the output for loopback of the selector 42d and the input ② for loopback of the selector 41d. The selector control unit 45 controls the selector 41d in so as to alternately select the output of the buffer 44a and the output of the buffer 44b to incorporate it into the selector 41d. The loopback control unit 43d and the selector 42d operate in the same way as the corresponding loopback control unit and selector in FIG. 4, FIG. 5A, FIG. 5B, or FIG. 8. This embodiment is preferably applied to a case where the length of a packet is constant.

Figure 14:
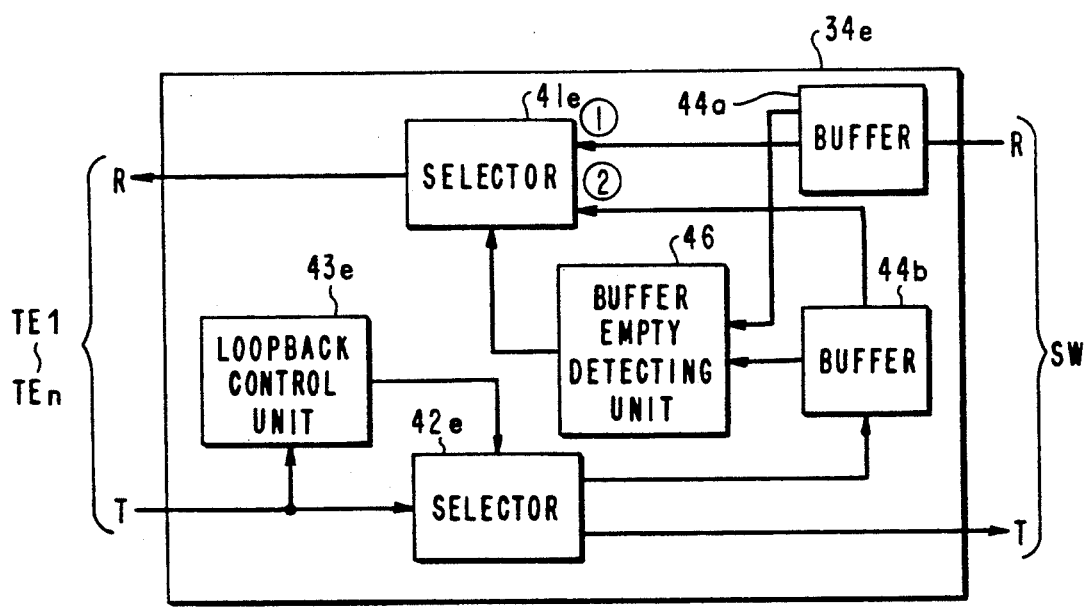
FIG. 14 is a block diagram showing another example of the construction in which two buffers are provided in the connection control unit, according to tenth embodiment of the present invention.

FIG. 14 is a block diagram showing the construction of the connection control unit (CC) according to a tenth embodiment of the present invention. In the figure, instead of the selector control unit 45 in FIG. 13, an empty buffer detecting unit 46 is provided. The empty buffer detecting unit 46 controls a selector 41e in such a way that, when either of the buffers 44a and 44b is empty, the packet from the other buffer is incorporated into the selector 41e. By doing this, since the output of the empty buffer in the buffers 44a and 44b is not selected by the selector 41e, the packet can be transferred efficiently.

FIG. 15 is a block diagram showing the construction of the connection control unit (CC) according to an eleventh embodiment of the present invention. In the figure, a first speed converting unit 47a is provided between the R line of the main network side and the first input of the selector 41f, a second speed converting unit 47b is provided between the loopback output of the selector 41f and the second input of the selector 41f, and a buffer 44f is provided between the output of the selector 41f and the R line of the subnetwork side. Accordingly, the buffer 44f is a common buffer for the loopback function and for the line from the main network.

In FIG. 15, the loopback control unit 43f controls only the selector 42f in accordance with the special signal LB from the T line of the subnetwork. Thus, in case of loopback, packets from the T line of the subnetwork are transmitted to the speed converting unit 47b. In case of through communication, they are transmitted to the T line of the main network. The packets from the main network are converted into high speed data by the speed converting unit 47a, selected by the selector 41f, and written in the buffer 44f at high speed. The loopback packets output from the selector 42f are also converted into high speed data by the speed converting unit 47b, selected by the selector 41f, and written at high speed into the buffer 44f. According to the sequence of writing into the buffer 44f, the packets are transferred to the terminal in the subnetwork. The selector control unit 45f controls the selector 41f so as to alternately select the outputs of the speed converting units 47a and 47b. Thus, after obtaining high speed data by speed conversion of packets, they are stored in the buffer, and they are transferred in accordance with the storing sequence, whereby the transfer of data can be effected at high speed.

FIG. 16A to 16C are diagrams showing a packet format in which a priority is added to the packet according to a twelfth embodiment of the present invention.

In FIG. 16A, the packet is provided with a priority signal PR, other than data, the destination identification label, and the special signal LB for indicating whether it is for loopback or not. As shown in FIG. 16B, when PR = "1" for example, outer lines have the priority to be processed, and when PR = "0", extension lines have the priority to be processed. Also, as shown in FIG. 16C, as a priority signal, the priority may be determined in accordance with the contents of the service. Namely, for example, when PR = "2", this means a signaling for a call setting having the highest priority; when PR = "1", this means sound or video data having the second priority order; and when PR = "0", this means data having the lowest priority.

Figure 17:
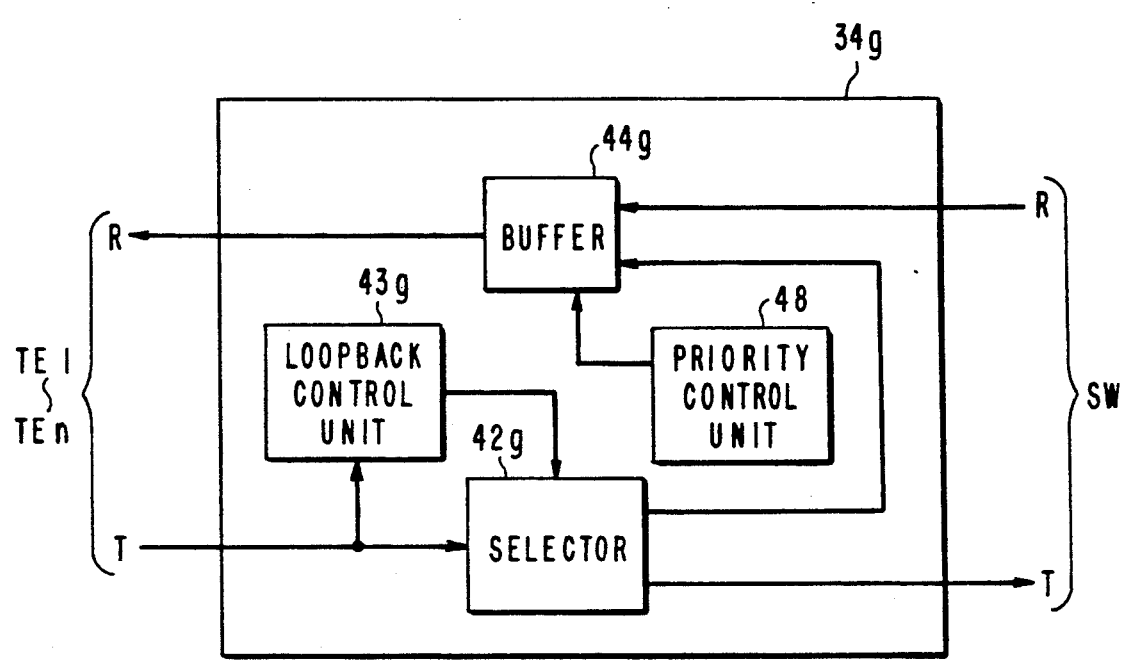
FIG. 17 is a block diagram showing a construction in which a priority control unit is provided in the connection control unit according to thirteenth embodiment of the present invention.

FIG. 17 is a block diagram showing the construction of the connection control part (CC) provided with a priority control unit 48 according to a thirteenth embodiment of the present invention. In this case, a loopback control unit 43g controls only a selector 42g in accordance with the special signal LB from the T line of the subnetwork side in the same way as in FIG. 15, so that in case of loopback, a packet from the T line of the subnetwork side is transmitted to a buffer 44g, and in case of the through communication, it is transmitted to the T line of the main network. The priority control unit 48 reads priority signals in the packets input to the buffer 44g, and outputs them sequentially from the buffer 44g in order from the higher priority.

Figure 18:
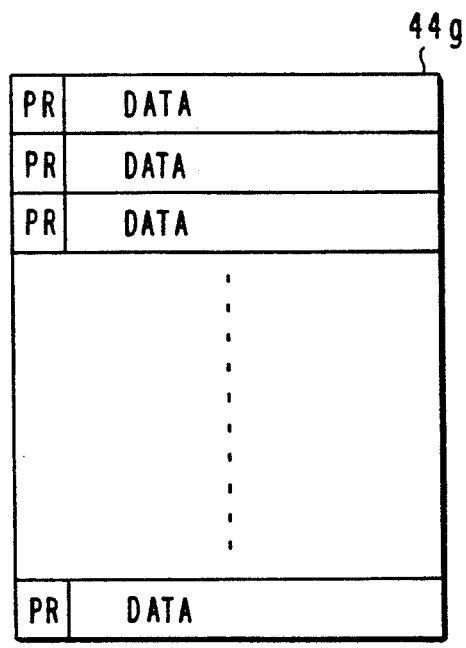
FIG. 18 is a diagram showing a construction of a buffer according to fourteenth embodiment of the present invention.

FIG. 18 is a diagram showing an example of the contents of the buffer 44g shown in FIG. 17. As shown in the figure, the buffer 44g stores, for each packet, data and a priority signal PR. In this case, the data includes data shown in FIG. 9 and the destination identification label, or data shown in FIG. 10, the destination identification label VCI, the special signal LB, the error correction code CRC, and so forth.

Figure 19:
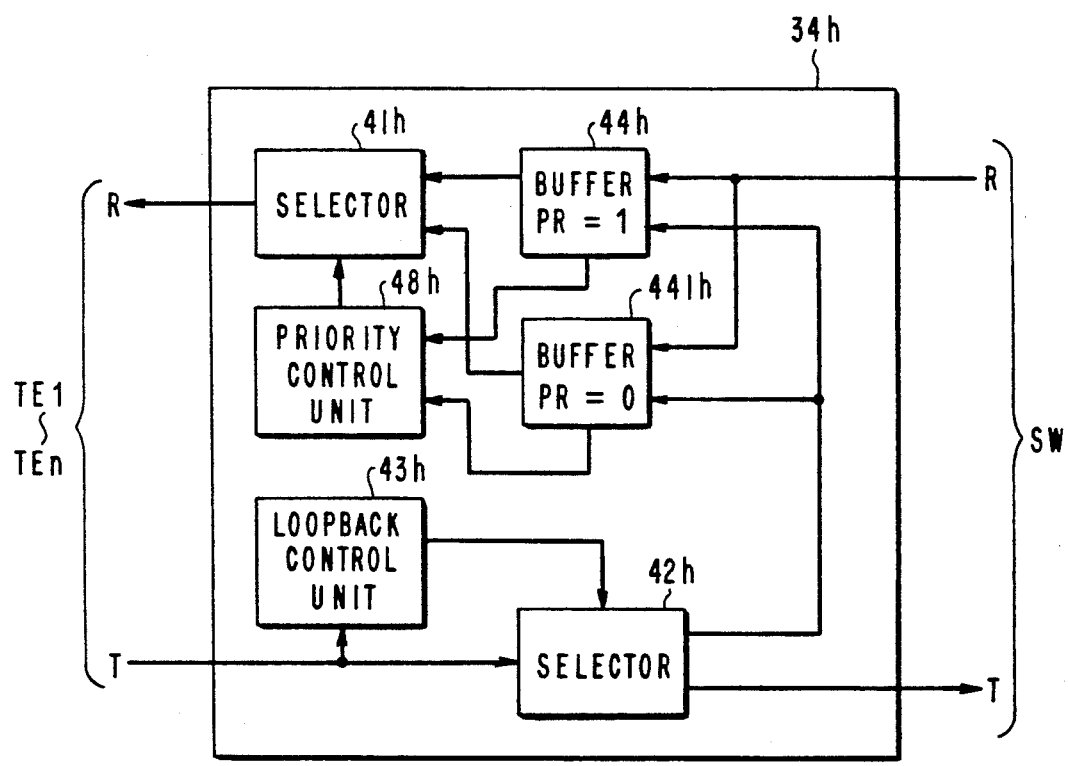
FIG. 19 is a block diagram showing a construction in which a buffer is provided for each priority in the connection control unit according to fifteenth embodiment of the present invention.

FIG. 19 is a block diagram showing the construction of the connection control unit (CC) according to a fourteenth embodiment of the present invention. In the figure, a buffer is provided for each priority, and data packets are stored in packets into buffers in accordance with the priorities. Namely, data of PR="1" is stored in a buffer 44h, and data of PR="0" is stored in a buffer 441h. The priority control unit 48h controls a selector 41h based on the priority signal stored in the buffer, and selects the output of the buffer 44h or 441h in the order of priorities to transmit to a terminal in the subnetwork. In this case also, the loopback control unit 43h controls only the selector 42h in accordance with the special signal LB from the T line of the subnetwork side so that, in the case of the loopback, the packet from the T line of the subnetwork side is transmitted to the buffers 44h and 441h, and in the case of the through communication, it is transmitted to the T line of the main network.

Figure 20:
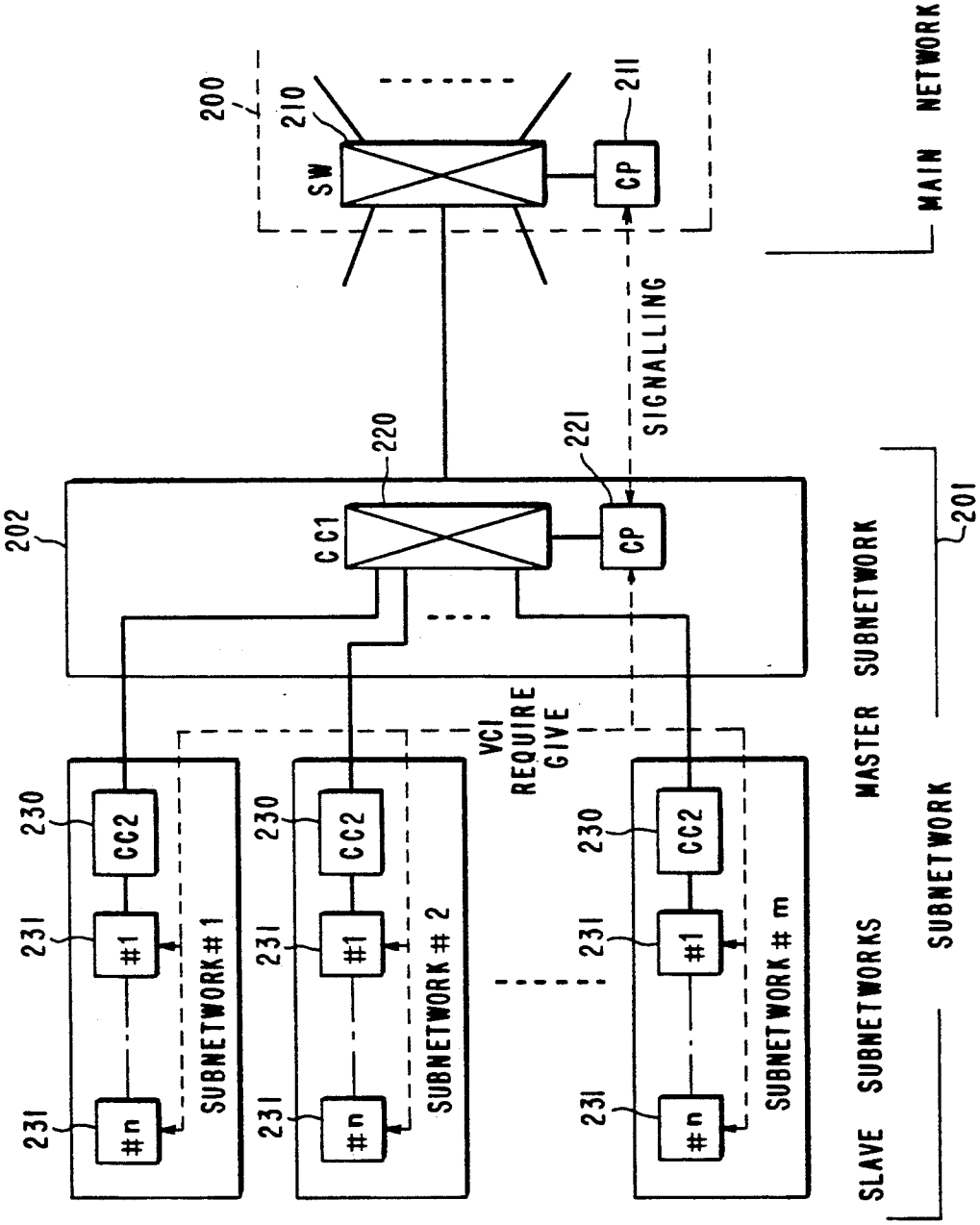
FIG. 20 is a block diagram showing a construction in which a plurality of subnetworks and a main network are connected, according to sixteenth embodiment of the present invention.

FIG. 20 is a block diagram showing a fifteenth embodiment of the present invention. In FIG. 20, a subnetwork 201 consists of a master subnetwork 202 and a plurality of slave subnetworks #1-#m. Each subnetwork comprises a connection control unit (CC2) 230 and a plurality of nodes #1-#n. To each node, a terminal (not shown) is connected. Each slave subnetwork may be considered as being replaced by each terminal shown in FIG. 3. The master subnetwork 202 comprises a connection control unit (CC1) 220 having an exchange function and a call setting processing processor (CP) 221. As the call setting processing processor (CC1) 220, a PBX is used. In this case, the master subnetwork (PBX) has the same function as the main network (public network) in the embodiment shown in FIG. 3. Even in a customer station network may have a plurality of subnetworks as above if the customer station network is a large scale network. The construction of the main network 200 is the same as the main network 30 in FIG. 3.

In this way, even when each terminal in FIG. 3 is replaced by a slave subnetwork to form layered networks, all of the above described embodiments of the present invention can be applied. Namely, each slave subnetwork requires, when it calls, from the master subnetwork 202, the destination identification label VCI. If the destination is in the subnetwork, the call setting processing processor (CP) 221 in the master subnetwork provides the destination identification label VCI to the calling terminal and to the called terminal. To the destination identification label VCI, the beforementioned special signal LB, TH or BT is added. Only when the destination is in the outer line, is the call setting process carried out by signalling with the call setting processing processor (CP) 211 in the main network. The connection control unit (CC2) 230 in each slave subnetwork carries out the loopback or through operation in accordance with the special signal from the terminal in the same way as the before-mentioned embodiments.

Figure 21:
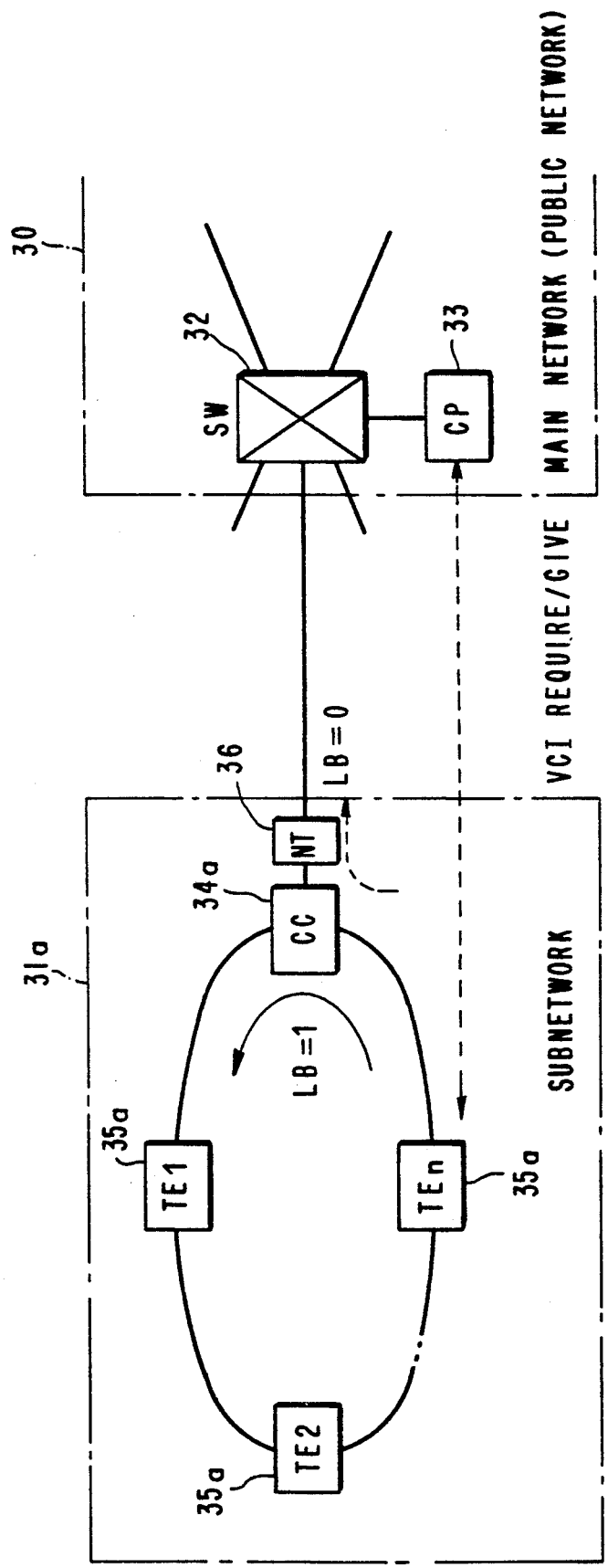
FIG. 21 is a block diagram showing an example in which a ring LAN is used as the subnetwork according to seventeenth embodiment of the present invention.

FIG. 21 is a block diagram showing still another embodiment of the present invention.

In FIG. 21, a subnetwork 31a is formed by a ring LAN, and 36 is a network terminal (NT). In this case also, the call setting process in the communication in the subnetwork or in the communication between the subnetwork and the main network is carried out by the call setting processing processor (CO) 33 in the main network 30 in the same way as the before-described embodiments. Similar to the before-described embodiments, when the special signal LB provided to the calling terminal is "1", the communication is effected in the ring LAN; and when the above-mentioned special signal LB is "0", a physical communication path is set between the main network 30 and the subnetwork 31a. Further, since the communication in the subnetwork and the communication through the main network are carried out by the same call setting processing processor, communication is possible by the same protocol. Therefore, no gateway for converting the protocol is necessary between the subnetwork 31a and the main network 30.

Figure 22:
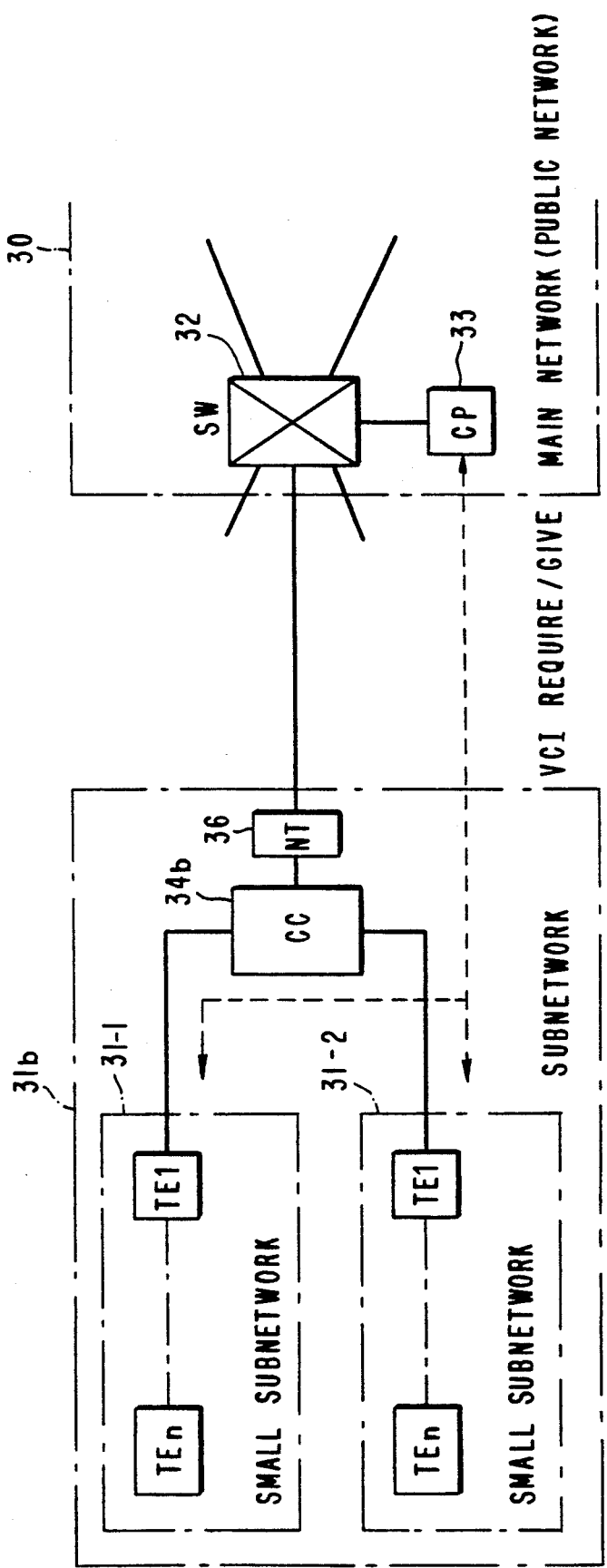
FIG. 22 is a block diagram showing an example in which a plurality of small subnetworks are provided in the subnetwork according to eighteenth embodiment of the present invention.

FIG. 22 is a block diagram showing still another embodiment of the present invention, in which the system is expanded to have a plurality of subnetworks. Namely, even when a subnetwork 31b is constructed by a plurality of small subnetworks 31-1 and 31-2, the same operation as in all of the embodiments described above is possible.

FIG. 23 is a block diagram showing the construction of the connection control unit (CC) 34b in FIG. 22. In the figure, the connection control unit (CC) 34b is further provided with a multiplexer (MUX) 231 for switching the small subnetworks and a distributor (DIST) 232.

In the above embodiments, explanations were given in which the special signal for the connection control is provided in the packet separately from the VCI, or is logically included in the destination identification label. The present invention, however, is not restricted to this. For example, it may be the first bit in the logical identification number in the header of the packet or it may be provided at any other place in the packet.

As described above, the invention has advantages which make it useful in industry. According to the present invention, by providing a physical path setting function in a subnetwork, various flexible multipoint communications can be realized and the construction of a network having superior expandability becomes possible. Further, there is no need to comprise a call setting processing function in the subnetwork so that an economic network can be constructed. Still further, the traffic due to the communication in the subnetwork does not flow into the exchange of the main network so that the exchange in the main network can be operated efficiently. Still further, since the call setting process is carried out between a terminal in the subnetwork and the exchange in the main network, and since the other units in the subnetwork do not relate to the call setting process, the scale of each unit (NT, CC and so forth) can be greatly reduced. Still further, the communication can be carried out by the same protocol regardless of the configuration of the communication such as the communication in the subnetwork, inter-subnetwork communication, communication through the main network, and so forth.

We claim:

1. An inter-network connecting system, comprising:
 a main network having an exchange and a call setting processing processor for controlling said exchange; and
 a subnetwork having terminals including a calling terminal which generates a calling number which is provided to said main network and a connection control unit, coupled to said main network and said terminals, including a loopback unit,
 said call setting processing processor responding to the calling number by providing said calling terminal with a first special signal to operate the loopback unit in said connection control unit to connect a first physical communication path for an extension line between terminals in said subnetwork when an extension line communication is to be performed in said subnetwork, and by providing said calling terminal with a second special signal to stop the operation of the loopback unit in said connection control unit and to connect a second physical communication path for an outer line between the exchange and the terminal in said subnetwork when an outer line communication is to be performed between said main network and the subnetwork; said call setting processing processor transmitting said first special signal to said calling terminal, said calling terminal adding said first or said second special signal to data to be transmitted; and said connection control unit determining whether the loopback unit should be operated for said data in accordance with said first special signal or said second special signal, to connect a physical communication path for said extension line communication and/or said outer line communication.

2. An inter-network connecting system as claimed in claim 1, wherein said main network and said subnetwork construct an integrated services digital network.

3. An inter-network connecting system as claimed in claim 1, wherein said first special signal and said second special signal are one or a plurality of fixed data groups.

4. An inter-network connecting system as claimed in claim 1, wherein:
said connection control unit includes a rewritable table;
said first special signal and said second special signal are one or a plurality of fixed data groups; and
said connection control unit compares said first special signal or said second special signal, added to the data from said calling terminal, with the contents of said table, to determine whether the loopback unit should be operated to connect a physical path.

5. An inter-network connecting system as claimed in claim 4, wherein said call setting processing processor comprises means for rewriting the contents of said table in said connection control unit.

6. An inter-network connecting system as claimed in claim 4, wherein said terminals comprise means for rewriting the contents of said table in said connection control unit.

7. An inter-network connecting system as claimed in claim 4, wherein:
said connection control unit comprises means for supervising traffic of said extension line communication and of said outer line communication; and
the contents of said table of said connection control unit are automatically changed in accordance with an amount of traffic in such a way that, an amount of data associated with said first special signal is increased when the amount of traffic of said extension line communication becomes larger than the amount of traffic associated with said outer line communication, and the amount of data associated with said second special signal is increased when the amount of traffic of said outer line communication becomes larger than the amount of traffic of said extension line communication.

8. An inter-network connecting system as claimed in claim 1, wherein:
a third signal is provided from said call setting processing processor, for simultaneously setting physical paths in the communication in said subnetwork and in the communication between said main network and the terminal of said subnetwork.

9. An inter-network connecting system as claimed in claim 1, wherein;
said data has a destination identification label therein, and said first special signal and said second special signal being logically provided in said destination identification label.

10. An inter-network connecting system as claimed in claim 8, wherein said third special signal is logically provided in said destination identification label.

11. An inter-network connecting system as claimed in claim 9, wherein said first special signal and said second special signal are subjected to error correction.

12. An inter-network connecting system as claimed in claim 10, wherein said third special signal is subjected to error correction.

13. An inter-network connecting system as claimed in claim 10, wherein said destination identification label is subjected to error correction.

14. An inter-network connecting system as claimed in claim 1, wherein said connection control unit is provided with a buffer for storing data; and
when an idle condition is found in the line from said main network, data is taken out from said buffer and transferred to said calling terminal.

15. An inter-network connecting system as claimed in claim 1, wherein a buffer for storing data is provided on the line between said connection control unit and said main network; and
when an idle condition is found in said extension line, data is taken out from said buffer and transferred to said calling terminal.

16. An inter-network connecting system as claimed in claim 1, wherein a first buffer and a second buffer for storing data are provided respectively to the loopback unit in said connection control unit and on the line between said connection control unit and said main network.

17. An inter-network connecting system as claimed in claim 16, wherein data is alternately taken out from said first buffer and said second buffer and transferred to said calling terminal.

18. An inter-network connecting system as claimed in claim 16, wherein said connection control unit comprises an idle communication detection unit for detecting which of said first buffer and said second buffer is empty, and, when either one of the buffers is empty, data are sequentially transferred from the other buffer to said terminal.

19. An inter-network connecting system as claimed in claim 1, further comprising:
a buffer connected to and common to said loopback unit in said connection control unit and the line of said connection control unit from the main network; and
writing means, coupled between said buffer, said outer line and said loopback unit, for writing, in a writing sequence, loopback data and the data from said main network at high speed and transferring the data to said terminal in accordance with the writing sequence into said buffer.

20. An inter-network connecting system as claimed in claim 19, wherein:
said loopback data and the data from said main network are provided with priority data; and
said connection control unit transfers the data from said calling terminal and the data from said main network to said calling terminal in a sequence of priority in accordance with said priority data.

21. An inter-network connecting system as claimed in claim 20, wherein said priority data indicates whether or not the extension line communication has priority over the outer line communication.

22. An inter-network connecting system as claimed in claim 20, wherein said priority data indicates a priority depending on the contents of the communication services including at least two of signaling, sound voice and video data.

23. An inter-network connecting system as claimed in claim 22, wherein said connection control unit comprises a priority control unit for writing the data from said main network, the data from said calling terminal and said priority data into said buffer and transferring the data from said main network and from said calling terminal to said terminals in accordance with the priority data read from said buffer.

24. An inter-network connecting system as claimed in claim 20, wherein said connection control unit comprises priority buffers for storing different priority data;
respective said priority buffers store the data stored on said priority data, and the data are transferred from respective buffers to said terminals in the order of the priority.

25. An inter-network connecting system as claimed in any one of claims 1 to 24, wherein each terminal is considered to be a small subnetwork, and said plurality of small subnetworks are connected to said main network.

26. An inter-network connecting terminals for data communication, said network system comprising:
a main network comprising:
an exchange connecting some of the terminals; and
a call setting processor sending a first or second signal to a calling terminal of the terminals in response to a calling number received from the calling terminal; and
a subnetwork connected to said main network and comprising:
connection control means for connecting a first physical path from the subnetwork to the main network when the calling terminal transmits the first signal sent by said call setting processor, and for connecting a second physical path within said subnetwork when the calling terminal transmits the second signal sent by said call setting processor.

27. A network system as claimed in claim 26, wherein the calling terminal transmits destination labels, said call setting processor and said connection control means include respective tables storing the destination labels, and said connection control means include respective tables storing the destination labels, and said connection control means connects the first physical path responsive to a first set of the destination labels and the second physical path responsive to a second set of the destination labels.

28. A network system as claimed in claim 26, wherein said connection control means comprises idle detection means for detecting whether a main line connected to said main network is idle and whether an extension line connected to said subnetwork is idle, and said connection control means connects the first physical path only when the main line is idle and connects the second physical path only when the extension line is idle.

29. A method of connecting terminals in a subnetwork including a connection control unit and in a main network having a call setting processor, said method comprising the steps of:
(a) generating a calling number indicating a called terminal of the terminals, in a calling terminal of the terminals;
(b) transmitting the calling number from the calling terminal to the call setting processor;
(c) generating a first or second signal responsive to the calling number in the call setting processor;
(d) transmitting the first or second signal from the call setting processor to the calling terminal;
(e) generating a third signal including the first or second signal in the calling terminal;
(f) transmitting the third signal from the calling terminal to the connection control unit; and
(g) establishing a first physical path from the subnetwork to the main network upon receiving the third signal including the first signal, and a second physical path within the subnetwork upon receiving the third signal including the second signal, using the connection control unit.

* * * * *

UNITED STATES PATENT AND TRADEMARK OFFICE
CERTIFICATE OF CORRECTION

PATENT NO. : 5,185,741
DATED : February 9, 1993
INVENTOR(S) : Kasuo IGUCHI et al.

It is certified that error appears in the above-indentified patent and that said Letters Patent is hereby corrected as shown below:

Col. 1, line 13, delete "," (second occurrence);
line 32, before "and" insert --,--.

Col. 2, line 41, delete ")";
line 66, change "group" to --groups--.

Col. 4, line 51, after "invention" insert --, for--;
line 67, change "pretend" to --present--.

Col. 5, line 3, delete ";";
line 11, after "to" insert --a--;
line 15, after "to" insert --a--;
line 19, after "to" insert --an--
line 22, after "to" (second occurrence) insert --a--
line 30, after "to" insert --a--;
line 33, after "to" insert --a--;
line 41, after "to" insert --a--;
line 48, after "to" insert --an--.

Col. 6, line 12, change "($CP_2$)" to --($CP_s$)--;
line 27, after "by" insert --a--;
line 52, change "($CP_2$)" to --($CP_s$)--.

UNITED STATES PATENT AND TRADEMARK OFFICE
CERTIFICATE OF CORRECTION

PATENT NO. : 5,185,741
DATED : February 9, 1993
INVENTOR(S) : Kasuo IGUCHI et al.

It is certified that error appears in the above-indentified patent and that said Letters Patent is hereby corrected as shown below:

Col. 7, line 14, after "Thus" insert --,-- and delete "in".

Col. 8, line 51, after "result" insert --,--.

Col. 9, line 45, after "to" insert --a--.

Col. 11, line 18, after "41b" insert --,--.

Col. 13, line 31, delete "in".

Col. 18, lines 8-10, delete "include respective tables storing the destination labels, and said connection control means".

Signed and Sealed this

Twenty-ninth Day of November, 1994

Attest:

BRUCE LEHMAN

*Attesting Officer*     *Commissioner of Patents and Trademarks*